(12) United States Patent
Carter

(10) Patent No.: US 6,536,367 B1
(45) Date of Patent: Mar. 25, 2003

(54) FLOATING COLLAPSIBLE UTILITY TRAILER

(76) Inventor: Vita Carter, P.O. Box 176, Helendale, CA (US) 92342

( * ) Notice: Subject to any disclaimer, the term of this patent is extended or adjusted under 35 U.S.C. 154(b) by 0 days.

(21) Appl. No.: 10/043,980

(22) Filed: Jan. 9, 2002

(51) Int. Cl.[7] .................................................. B60P 3/10
(52) U.S. Cl. ...................... 114/344; 114/354; 280/414.1
(58) Field of Search ................................. 114/343, 354, 114/344, 351, 352; 280/414.1

(56) References Cited

U.S. PATENT DOCUMENTS

| | | |
|---|---|---|
| 2,659,464 A | 11/1953 | Sweetman |
| 3,090,973 A | 5/1963 | Levinson |
| 3,940,813 A | 3/1976 | Konstantinov et al. |
| D243,162 S | 1/1977 | Konstantinov et al. |
| D292,785 S * | 11/1987 | Warren ........................ D12/101 |
| 4,781,392 A * | 11/1988 | Cooper ...................... 280/414.1 |
| 5,228,713 A * | 7/1993 | Kovach ...................... 280/414.1 |
| 5,332,249 A * | 7/1994 | Solberg et al. ........... 280/414.1 |

* cited by examiner

Primary Examiner—Stephen Avila
(74) Attorney, Agent, or Firm—Brande & McCleary; Lewis M Brande; Thomas A. McCleary

(57) ABSTRACT

This invention describes a floatable, collapsible utility trailer which can be filled with gear and towed behind a boat or, alternatively, pulled behind a person on dry land. The unit is collapsible for easy carrying and storage and comes with a carrying handle.

5 Claims, 6 Drawing Sheets

(VIEW A-A)

(VIEW B-B)

(VIEW C-C)

(VIEW of 21)

US 6,536,367 B1

FLOATING COLLAPSIBLE UTILITY TRAILER

BACKGROUND OF THE INVENTION

1. Field of the Invention

In the field of utility trailers, persons are at a disadvantage if they wish to carry extra objects when they go boating. Most trailers that are currently available, are either designed with very large capacities in mind, or re made specifically to convert into a boat. Examples of existing designs include trailers that are towed behind a motor-vehicle and are easily converted to either a motorized boat, a non-motorized boat, or a boat-like object. The current designs are designed with personal water-craft and small boat owners in mind who would like to carry extra objects such as coolers, canopies, beach chairs, etc. outside the boat area. This aggravates the problem of space consumption that the all carry-on it ms create, or in the case of personal crafts, is not available at all.

The current invention is a small collapsible trailer that is made from a flexible material, which makes the trailer very easy to collapse into a smaller size than it takes up when in use. The trailer is pulled like a wagon, then launched into the water, It can then be pulled from the water behind a PC or boat. The current invention is specifically designed for carrying bulky objects, such as water coolers, that ordinarily would take up too much space in small boats or is not available to personal water-craft owners. The current invention is water tight, and is designed to be towed behind a small boat or personal water-craft on the water. When the carry-on objects are in the utility trailer, more space is made available in the boat.

2. Description of the Prior Art

Collapsible utility trailers are known in the art.

U.S. Pat. No. 3,940,813 discloses a collapsible trailer boat wherein the fore part and after part are hinged together so that the trailer can be pivotally moved. When open, the trailer represents a boat in the shape of a catamaran. The after portion of the boat has provisions to mount an outboard motor. When closed, the fore part rests on the after part with the fore part's bottom facing upwards. The after portion of the trailer/boat may be used as a single-room home when on land, while the fore part may be used as a separate craft.

U.S. Pat. No. 3,090,973 discloses a boat having a front section and a rear section where the front section may be pivoted until it rests over the rear portion, forming a storage compartment. The trailer/boat has wheels hat may be retracted. The patent also discloses the trailer/boat being capable of use as a sleeping or living quarters.

U.S. Pat. No. 2,659,464 discloses a hinged boat, shaped cargo carrier that is capable of being made water and dirt tight. The invention is made to be carried on top of a motor-vehicle.

The foregoing descriptions of prior art patents disclose trailers that all are made from hard materials and are all hinged at a center area to fold closed.

SUMMARY OF THE INVENTION

The present invention offers a solution to the shortcomings of the prior art inventions The object of the present invention is to provide a trailer that is small enough to be easily carried inside a motor vehicle. This will make it relatively easy for persons with small craft to carry the trailer without measurable loss of valuable space.

Another object of the present invention is to wheels that easily rotate to which will allow the owner easy movement from t e motor vehicle to the water, and return. The invention has straps mounted on the sides that allow for easy securing to the craft when in the water, allowing for towing the invention in the water on the side of the personal watercraft.

Another object of the present invention is that the trailer is fabricated from soft materials such as but not limited to vinyl, plastic and like materials that are easily sealed and made waterproof, as well as flexible. These mat rials allow the trailer to be made water tight, allowing the trailer to be towed behind or attached to the side of a boat. This advantage frees up valuable space in small personal boats. The trailer can be easily collapsed creating a small footprint for storage. Fabricating the present invention from soft materials has the additional benefit of making the floating trailer light.

DETAILED DESCRIPTION

Figure 1:
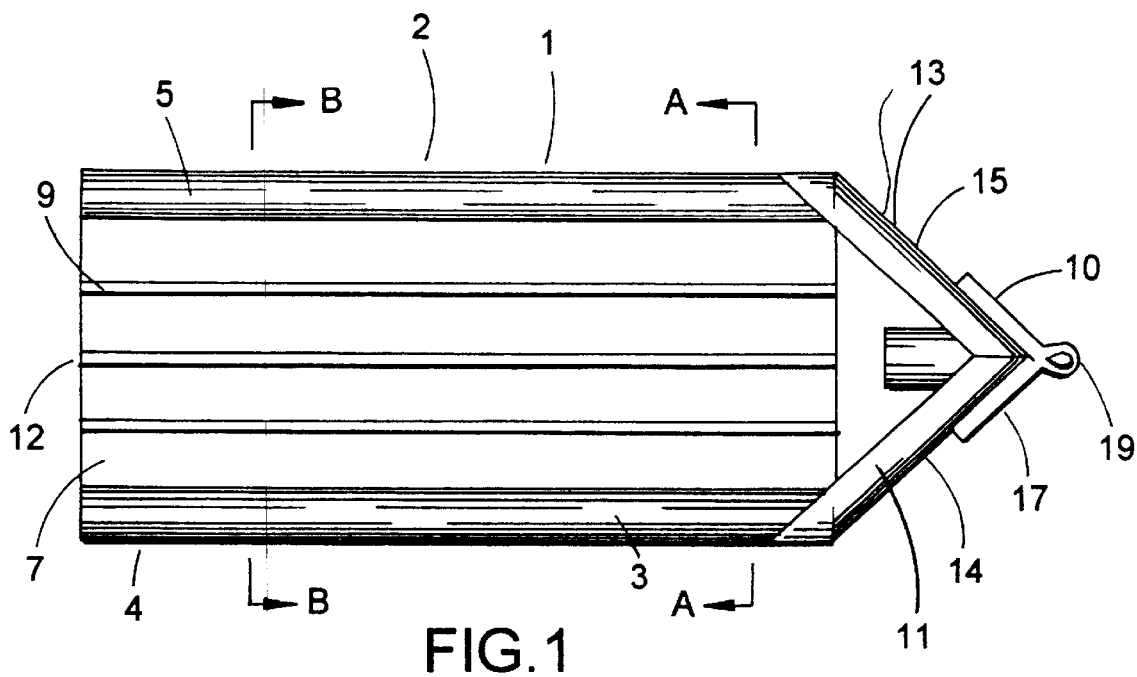
FIG. 1 shows the utility trailer in Top View.
2.

While the invention is susceptible of embodiment in many different forms, there is shown in the drawings and will he in be described in detail, one specific embodiment, with the understanding that the present disclosure is to be considered as an exemplification of the principles of the invention and is not intended to limit the invention to the embodiment illustrated.

FIG. 1 in the drawings shows the top view of the utility trailer (1) which depicts a first lower flotation support (3) and a second lower flotation support (5). The utility trailer has a port (or right) side (2), a starboard (or left) side (4), a stern (or back) (12) and a bow (or front) (14) of the utility trailer (1). The bottom (7) of the utility trailer (1) has a multiplicity of bottom supports (9) the bottom supports running in the fore and aft direction of the utility trailer (1). The front (10) of the utility trailer (1) has a first bow flotation support (11), a second bow flotation support (13), a central bow flotation support (5) and a tow hitch (17) with a tow loop (19).

Figure 2:
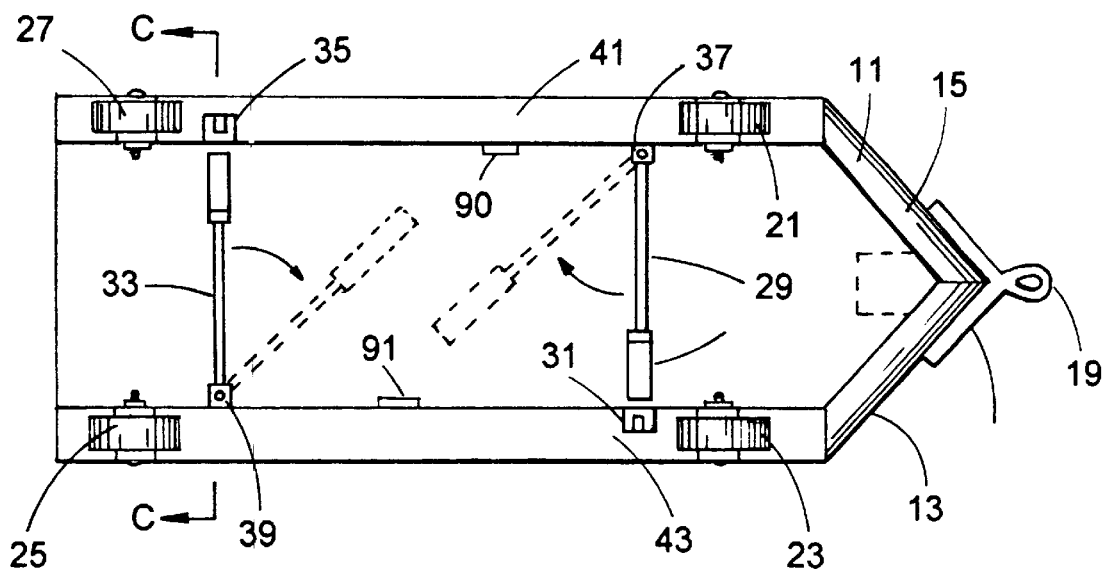
FIG. 2 shows the utility trailer in a view looking up at the bottom of the trailer.
3.

FIG. 2 is a bottom view of the utility trailer (1) which reveals a first wheel assembly (21) a second wheel assembly (23), a third wheel assembly (25) and a fourth wheel assembly (27). The first wheel assembly (21) and the fourth wheel assembly (27) are mounted on a first bottom support rail (41). The second wheel assembly (23) and the third wheel assembly (25) are mounted on a second bottom support rail (43) and are arranged so as to create a quadrilateral relationship between the first wheel assembly (21), the second wheel assembly (23), the third wheel assembly (25) and the fourth wheel assembly (27), where ea h wheel assembly is positioned in a vertex of the quadrilateral. Also shown is a first trailer spreader bar assembly (29) with a first threaded receptacle (31) in the second bottom support rail (43) to receiveably secure the first trailer spreader bar assembly (29). There is a second trailer spreader bar assembly (33) with a second threaded receptacle (35) mounted on the first bottom support rail (4) to receiveably secure the second trailer spreader bar assembly (33). In addition there is a first pivot (37) attached to the first bottom support rail (41) for the first trailer spreader bar assembly (29) and a second pivot (39) attached to the second bottom support rail (43) for the second trailer spreader bar assembly (33). As depicted in FIG. two, the first spreader bar assembly (29) pivots about the first pivot (37) and is secured by a first clamp (90) which is mounted on the first bottom support rail (41). The second spreader bar assembly (33) pivots about the second pivot (39) and is secured by a second clamp (91) which is mounted on the second bottom support rail (43).

Figure 3:
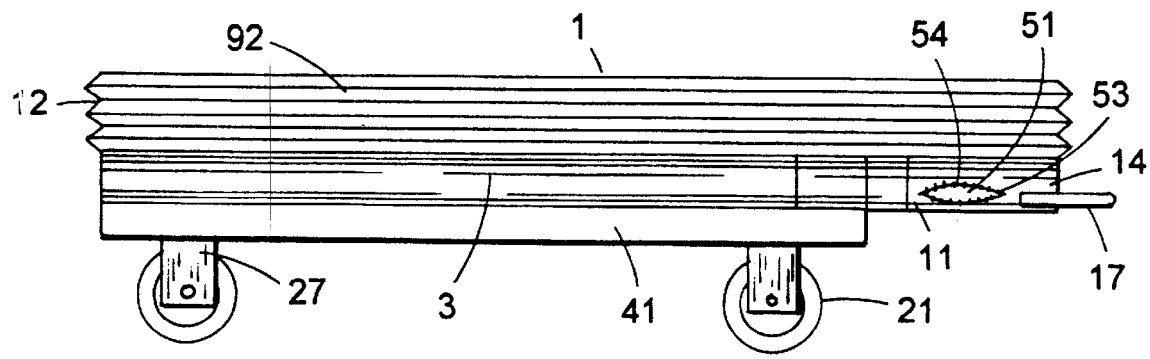
FIG. 3 is a side view of the right (starboard) side of the utility trailer.
4.

FIG. 3 shows a s de view of the right side of the utility trailer and shows the first bottom support rail (41) and wheel assembly (21) which is located toward the front (10) of the utility trailer (1) and mounted therein. The fourth wheel assembly (27) is located toward the back (12) of the utility trailer (1). The first lower flotation support (3), the first bow flotation support (11) and the tow hitch (17) are seen in the side view. Additionally, the first bow flotation support (11) has a zipper (53) located on the first bow flotation support's (11) side and when the zipper (53) is unfastened, an opening (54) is created allowing a removable flotation support (51) to be pulled out for storage. An analogous structure exists for the opposing (left) side. Also denoted in figure three is a collapsible storage compartment (92) which is depicted as a bellows type of structure.

Figure 4:
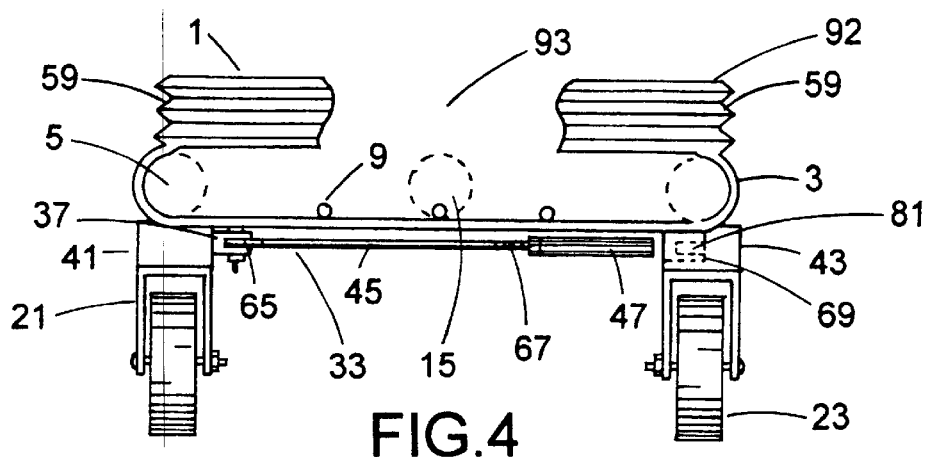
FIG. 4 is a view looking aft at the bow of the utility trailer, also denoted as View A.
5.

FIG. 4 (or view A) hows a view looking aft at the bow of the utility trailer (1) and shows the first bottom support rail (41) and a second bottom support rail (43) opposing the first bottom support rail (41). The second wheel assembly (23) is mounted on the second bottom support rail (43), and the first wheel assembly (21) is mounted on the first bottom support rail (41). A first clevis (37) is mounted onto the first bottom support rail (41). A first support rod (45) has on one end a threaded portion (67) and an opposing end a standard rod end (65). The standard rod end (65) located on the first support rod (45) is pivotably mounted in the first clevis (37) located on the first bottom support rail (41). A rod cap (47) is threadably attached to the threaded portion (67) of the first support rod (45). Opposing the first clevis (37), and located on the second bottom support rail (43) is a first cavity (69) which is capable of firmly positioning the rod cap (47) when threadably extended. The first support rod (45) is in a perpendicular orientation to the first bottom support rail (41) and the second bottom support ail (43) when the rod cap (47) is positioned in the first cavity (69) located in the second bottom support rail (43). The collapsible storage compartment (92) is shown extending downwards a d being secured on the first bottom support rail (41) and the second bottom support rail (43), and mounting the multiplicity of bottom supports (9) which is located within the collapsible storage compartment (92). When extended, the collapsible storage compartment (92) defines an internal watertight cavity (93) that encases the first lower floatation support (3), the second lower flotation support (5), and the multiplicity of bottom supports (9).

Figure 5:
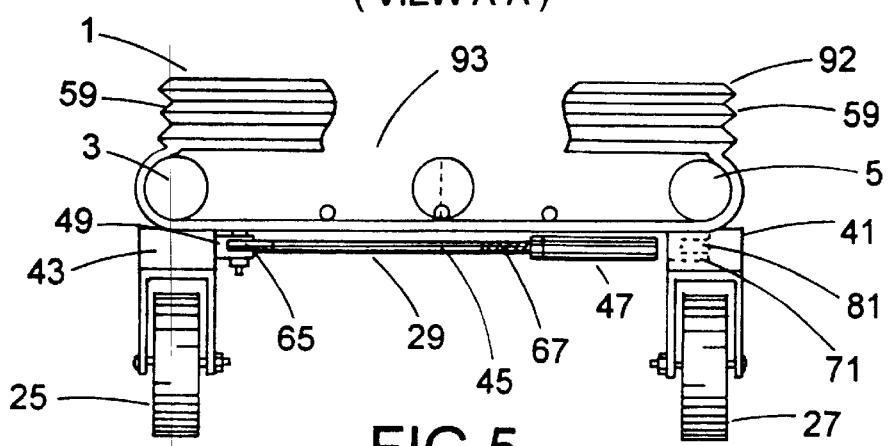
FIG. 5 is a view looking forward from the stern of the utility trailer, also denoted as View B.
6.

FIG. 5 (or view B) hows a view looking from the bow to the stern of the utility trailer (1) and shows the first bottom support rail (41) and the second bottom support rail (43) opposing the first bottom support rail (41). The third wheel assembly (25) is mounted on the second bottom support rail (43), and the fourth wheel assembly (27) is mounted on the first bottom support rail (41). A second clevis (49) is mounted onto the second bottom support rail (43). A first support rod (45) has on one end a threaded portion (67) and an opposing end a standard rod end (65). The standard rod end (65) located on the first support rod (45) is pivotably mounted in the second clevis (49) located on he second bottom support rail (43). An internally threaded rod cap (47) is threadably attached to the threaded portion (67) of the first support rod (45). Opposing the second clevis (49) located on the first bottom support rail (41) is a second cavity (71) which is capable of firmly positioning the rod cap (47) when extended. The first support rod (45) is in a perpendicular orientation to the first bottom support rail (41) and the second bottom support rail (43) when the rod cap (47) is positioned in the second cavity (71) located in the first bottom support rail (41). The collapsible storage compartment (92) is shown extending downwards and being secured onto the first bottom support rail (41) and the second bottom support rail (43).

Figure 6:
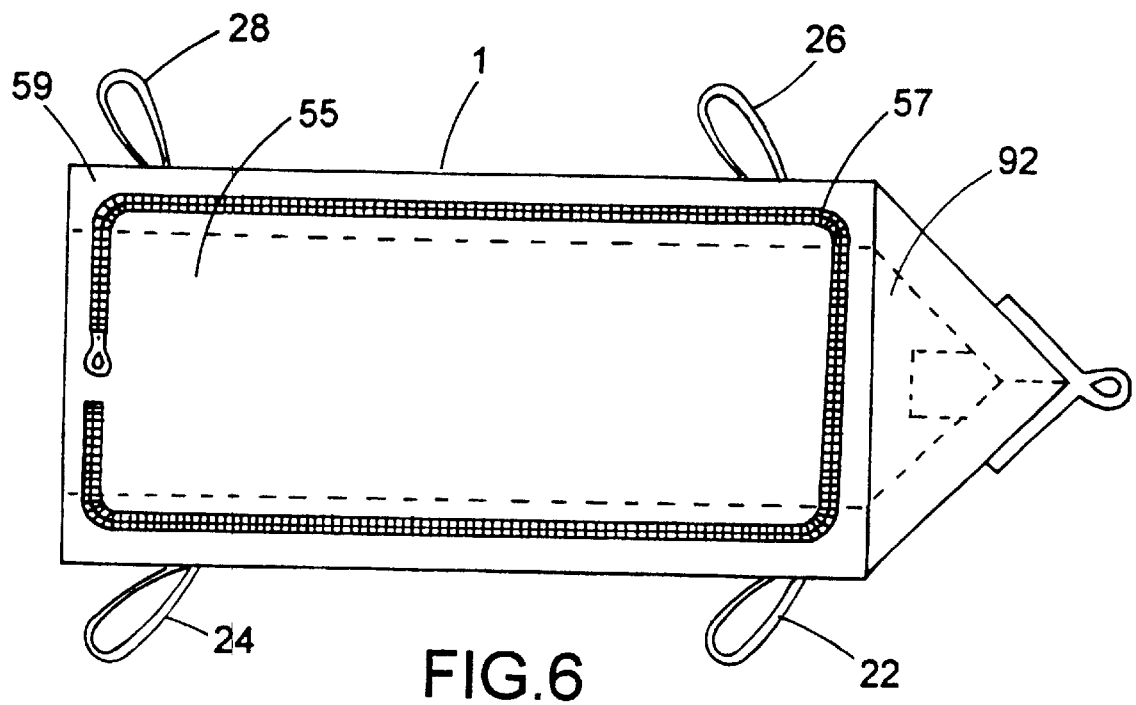
FIG. 6 is a top view of the utility trailer showing the top compartment sealed with a zipper like apparatus.
7.

FIG. 6 depicts a top view of the collapsible utility trailer (1) showing a top protective flap (55), a zipper (57) for the top protective flap (55). Attached to the sides of the sides (59) of the collapsible storage compartment (92) are a first starboard bow towing strap (22), a second starboard stern towing strap (24), a third port bow towing strap (26) and a fourth port stern towing strap (28). The towing straps (22, 24, 26, 28) can be used to pull the utility trailer (1) while the utility trailer (1) is in the water.

Figure 7:
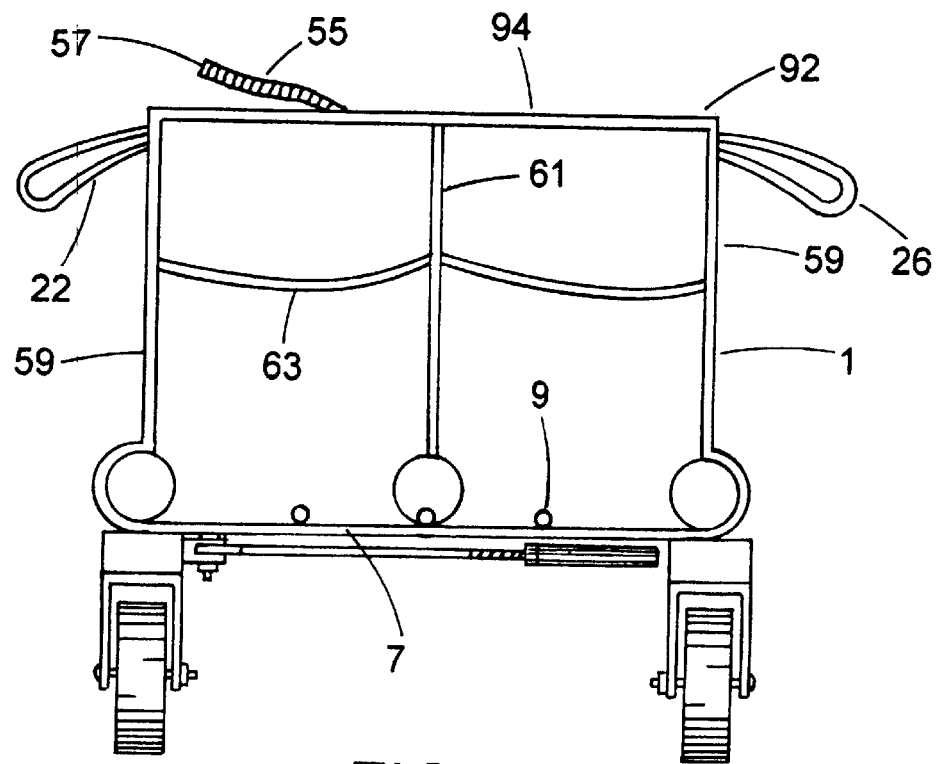
FIG. 7 is a view looking forward from the front of the trailer into the utility trailer, showing the horizontal and vertical internal compartments deployed.
8.

FIG. 7 shows a side view of the collapsible storage compartment (92), as seen from the bow of the collapsible utility trailer (1) looking to the stern. The collapsible storage compartment (92) has a pair of sides (59) opposing each other and a top portion (94) of the collapsible utility trailer (1). The top portion (94) showing the top protective flap (55), partially unzipped, and ajar from the top portion (94) of the collapsible utility trailer (1). When the collapsible storage compartment is expanded as shown, the pair of sides (59) show deployment of a vertical central deployable storage compartment (61) and a horizontal central deployable storage compartment (63) the horizontal central deployable storage compartment (63) being attached to the pair of sides (59) and the vertical deployable storage compartment (61) being attached to the top portion (94) and the bottom (7) of the collapsible utility trailer (1).

Figure 8:
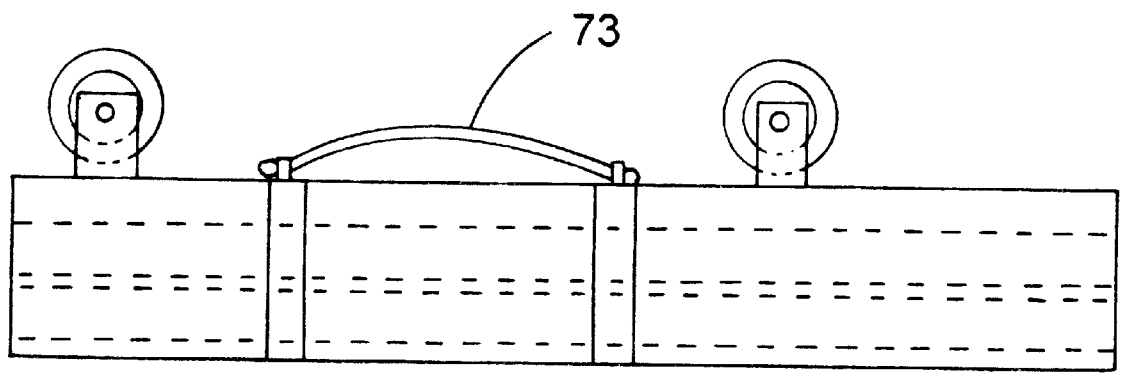
FIG. 8 shows the utility trailer in a collapsed storable position with holding straps.
9.

FIG. 8 is a side view of the collapsed utility trailer showing a carrying handle (73) for carrying the trailer.

Figure 9:
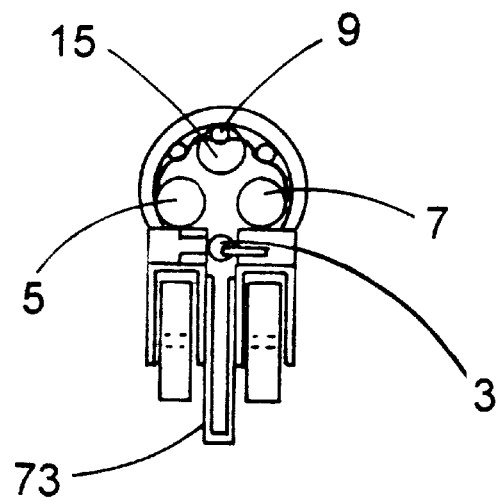
FIG. 9 shows an end view of the utility trailer in a collapsed storable position showing the stowed position of the bottom supports and flotation devices.
10.

FIG. 9 is an end view of the collapsed utility trailer showing the first lower flotation support (3), the second lower flotation support (5), the central bow flotation support (15), a multiplicity of bottom supports (9), the bottom (7) of the collapsible utility trailer (1), an end view of a spreader bar assembly (29, 31) and the carrying handle (73).

Figure 10:
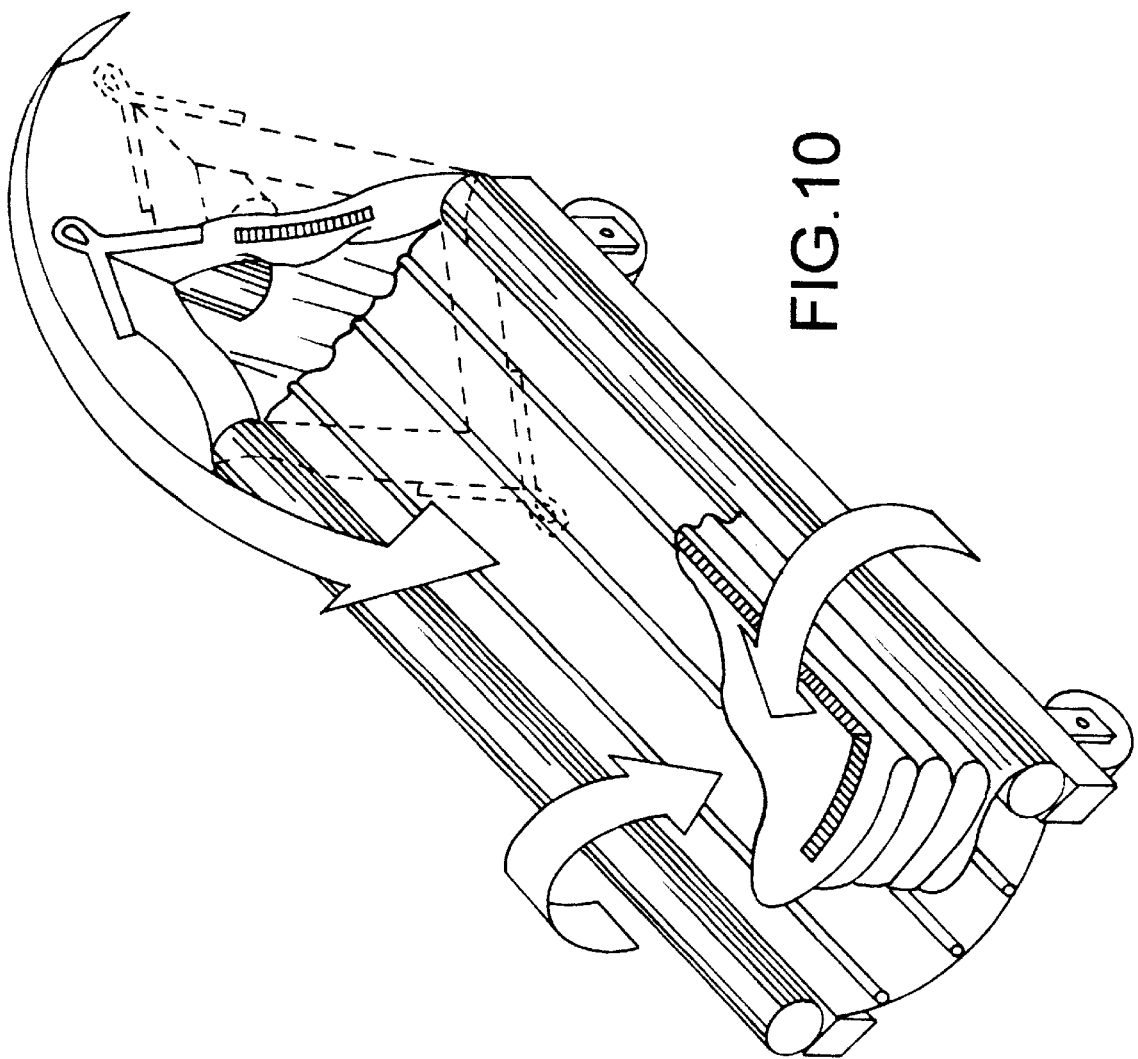
FIG. 10 shows a 3 dimensional perspective view of the trailer and how each component collapses to create a storable utility trailer.
11.

FIG. 10 illustrates, in three-dimensional perspective of how the various components of the collapsible utility trailer (1) fold in upon themselves to create a collapsed utility trailer.

Figure 11:
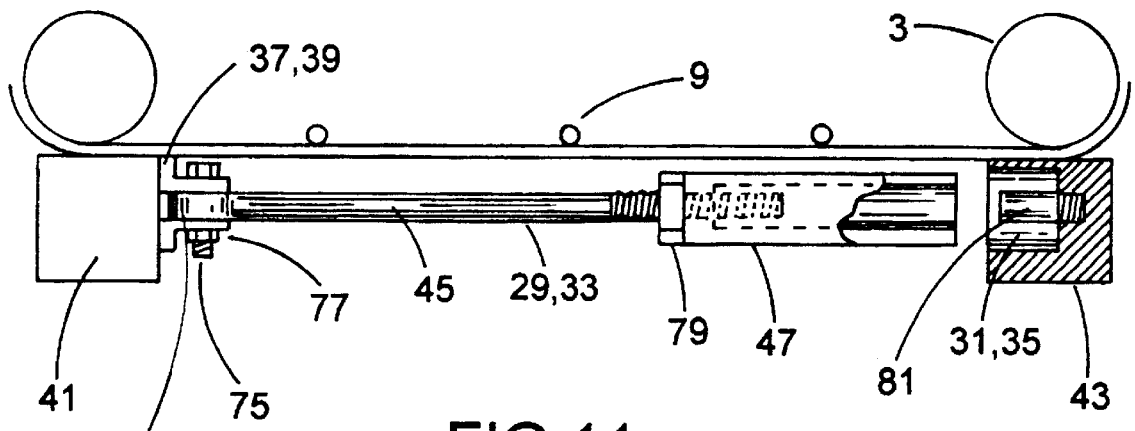
FIG. 11 shows a detailed view of a spreader bar, also known as view C.
12.

FIG. 11 is a close view of a spreader bar assembly (29,33) showing the spreader bar assemblies (29,33) with the support rod (45). The support rod has a standard rod end (65) on one end. A bolt (75) is shown attaching the standard rod end (65) of the spreader bar assembly (29,33) to the corresponding clevis (37,39). A nut (77) fastens on to the bottom of the bolt (75) which passes through the corresponding clevis (37,39) and the standard rod end (65) allowing the spreader bar assembly (29,33) to freely rotate. The other end of the support rod (45) is shown with the external threads that threadably mate with the end cap (47). A lock nut (79) is used to secure the position of the end cap (47) on an alignment stud (81) after the end cap is extended which will secure the first bottom support rail (41) and the second bottom support rail (43) in their respective separated positions for travel. The alignment stud (81) is mounted and centered in the corresponding threaded receptacle (31,35).

Figure 12:
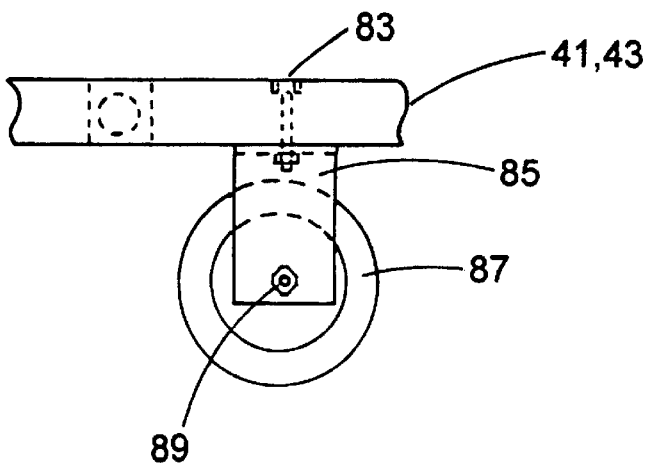
FIG. 12 shows a detailed view of a wheel assembly.

FIG. 12 shows close up view of a wheel assembly (21,23,25,27). A first nut and bolt assembly (83) passes through a bottom support rail (41,43) and attaches a U-bracket (85) to the bottom support rail (41,43) where the nut and bolt assembly (83) may be made loose enough to allow the wheel assembly (21,23,25,27) to rotate allowing for easy transport. A wheel (87) is centered within and attached to the U-bracket (85) with a second nut and bolt assembly (89) allowing the wheel (87) to freely rotate.

What is claimed is:

1. A floating collapsible utility trailer, comprising:
   a) a bow, said bow being essentially triangular in shape and being located in the front of the floating collapsible utility trailer, a stern, said stern being located in the rear portion of the floating collapsible utility trailer, said bow and said stern each being attached to a port side and a starboard side, a bottom, said bottom attaching to said bow, said stern, said port side and said starboard side, a top portion, said top portion attaching to said bow, said stern, said port side and said starboard side, said top portion defining an internal watertight cavity therein;
   b) means to remove a top protective flap from said top portion creating access to said watertight cavity;
   c) means for flotation of the floating collapsible utility trailer, said means for flotation being located on said bottom of the floating collapsible utility trailer;
   d) a first rail, said first bottom rail being attached to said bottom of the floating collapsible utility trailer and located on said starboard side, a second bottom rail, said second bottom rail being attached to said bottom of the floating collapsible utility trailer and located on said port side, at least four wheel means, a pair of said wheel means being attached to said first bottom rail, another pair of said wheel means being attached to said second bottom rail, said four wheel means creating a quadrilateral relationship between each other;
   e) means to separate said first bottom rail and said second bottom rail when the floating collapsible utility trailer is expanded to carry objects;
   f) means store said means to separate said first bottom rail and said second bottom rail when the floating collapsible utility trailer is collapsed;
   g) means to tow the floating collapsible utility trailer on land;
   h) means to tow the floating collapsible utility trailer in the water; and
   i) strap means to secure the floating collapsible utility trailer in a collapsed state when not in use.

2. The floating collapsible utility trailer as claimed in claim 1, wherein:
   a) said means to separate said first bottom rail and said second bottom rail is at least two spreader bar assemblies, a first spreader bar assembly is pivotably attached to said first bottom rail and is threadably secured to said second bottom rail, a second spreader bar assembly is pivotably attached to said second bottom rail and is threadably secured to said first bottom rail.

3. The floating collapsible utility trailer as claimed in claim 1, wherein:
   a) said means for flotation consists of a first lower flotation support, and a second lower flotation support, said first lower flotation support being located on said port side and on said bottom of the floating collapsible utility trailer, said second lower flotation support being locate on said starboard side and on said bottom of the floating collapsible utility trailer;
   b) said means for flotation further consists of a first bow flotation support, said first bow flotation support being located on said starboard side of said bow, said second bow flotation support being located on said port side of said bow, a central bow flotation support located between said first and said second bow flotation supports, towards the front of said bow of the floating collapsible utility trailer; and
   c) means for removing said first bow flotation support from said starboard side bow, and means for removing said second bow flotation support from said port side bow.

4. The floating collapsible utility trailer as claimed in claim 1, wherein:
   a) said means for towing the floating collapsible utility trailer in the water consists of at least four straps, a first strap and a second strap being located on said starboard side and located towards said top portion of said starboard side with said first strap being fixed near said bow of the floating collapsible utility trailer, and said second strap being fixed near said stern of the floating collapsible utility trailer, a third strap and a fourth strap being located towards said top portion with said third strap being fixed near said bow of the floating collapsible utility trailer and said fourth strap being fixed towards said stern of the floating collapsible utility trailer.

5. The floating collapsible utility trailer as claimed in claim one, wherein:
   a) said bottom of the floating collapsible utility trailer has a multiplicity of bottom supports, said multiplicity of bottom supports being attached to said bottom of the floating collapsible utility trailer and extends from said bow to said stern of the floating collapsible utility trailer stiffening said bottom of the floating collapsible utility trailer, thereby offering support for articles stowed within said internal watertight cavity.

* * * * *